April 6, 1926.
J. L. DROHEN
AUTOMOBILE ATTACHMENT
Filed June 13, 1924
1,580,023
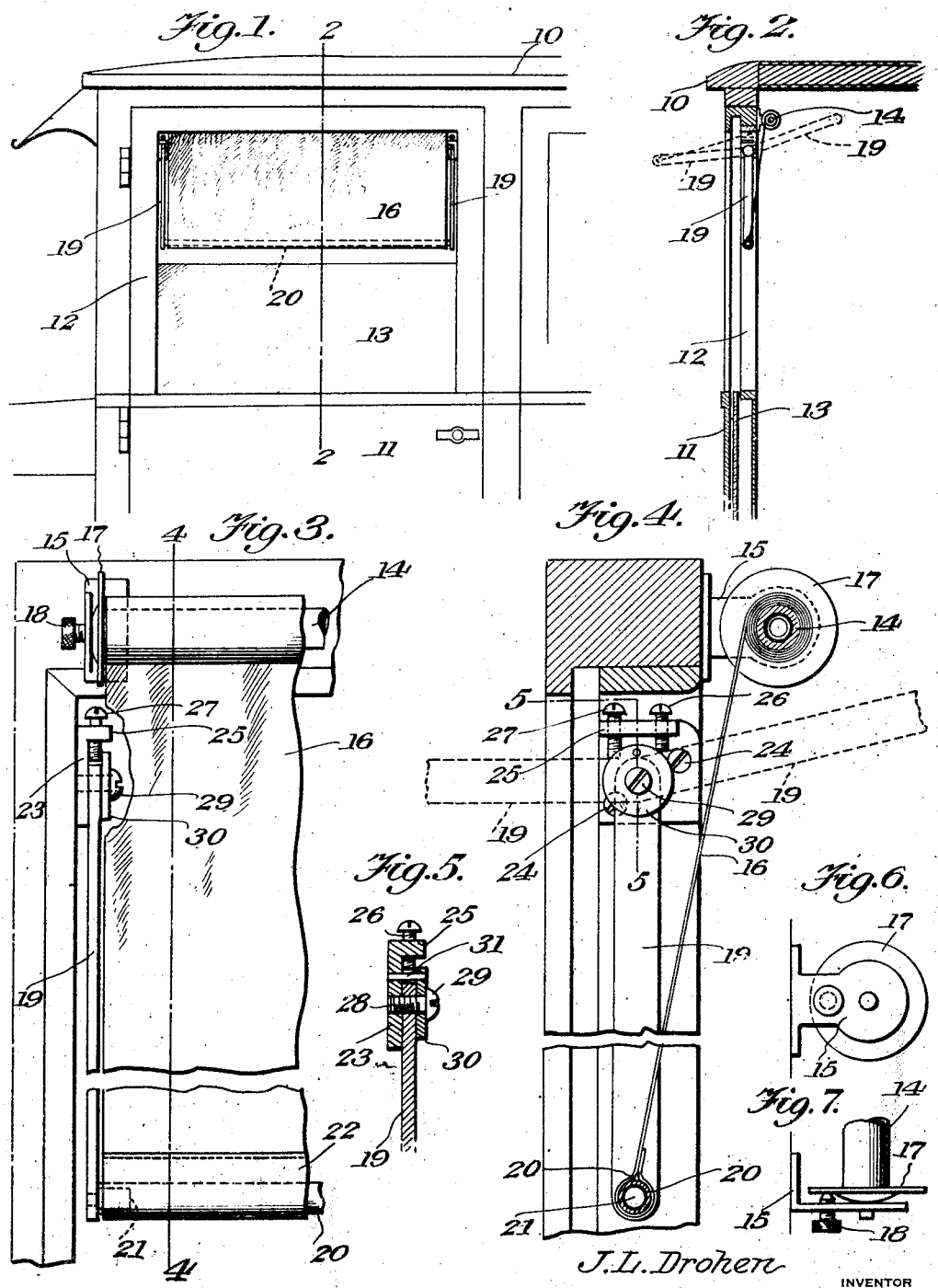
J. L. Drohen
INVENTOR
BY Victor J. Evans
ATTORNEY Patented Apr. 6, 1926.

1,580,023

UNITED STATES PATENT OFFICE.

JAMES L. DROHEN, OF DUNKIRK, NEW YORK.

AUTOMOBILE ATTACHMENT.

Application filed June 13, 1924. Serial No. 719,865.

*To all whom it may concern:*

Be it known that I, JAMES L. DROHEN, a citizen of the United States, residing at Dunkirk, in the county of Chautauqua and State of New York, have invented new and useful Improvements in Automobile Attachments, of which the following is a specification.

This invention relates to automobile accessories.

In driving automobiles, especially in warm weather, the driver occupies a position wherein one side is subjected to the intense heat of the sun rays and the glare which makes it very uncomfortable especialy when driving for long intervals.

It is therefore the purpose of the present invention to provide an attachment or accessory in the nature of a combined sun shade and glare protector, capable of being arranged to extend either inwardly or outwardly from the side of the vehicle, and positioned at any desired angle to properly protect or shield the driver from the detrimental effects of the sun rays, and at the same time not obstruct his vision from the side of the car.

One of the chief chracteristics of the present invention resides in the provision of means adapted to be mounted upon the window frame, and capable of being swung inwardly or outwardly through the window opening, after the window has been lowered, the said means being connected with the lower end of the ordinary window shade, so that the latter can be wound about or unwound from its roller, depending upon the direction in which the said means is moved, and the ultimate position occupied thereby.

More specifically stated, the invention contemplates the use of a substantialy U-shaped frame pivoted on the sides of the window frame and having its cross piece connected with the lower end of the window shade roller, the frame being mounted to occupy a position parallel with the window at the inside thereof when the window is closed, or capable of being swung inwardly of the vehicle at any desired angle, or projected outwardly through the window opening, subsequent to the lowering of the windows, whereupon the window shade is wound about or unwound from its roller to follow the movements of the frame, the frame being frictionally held fixed relatively to the window frame in any of its given positions.

The nature and advantages of the invention will be better understood when the following detailed description is read in connection with the acompanying drawings, the invention residing in the construction, combination and arrangement of parts as claimed.

In the drawings forming part of this application, like numerals of reference indicate similar parts in the several views, and wherein:

Figure 1 is a fragmentary side elevation of an automobile showing the invention arranged in a position parallel with the window.

Figure 2 is a sectional view taken on line 2—2 of Figure 1 showing the window in its lowered position, with the attachment in a vertical position by full lines, and several of its adjusted positions by dotted lines.

Figure 3 is a fragmentary view looking from the inside of the car showing how the attachment is mounted upon the window frame and its position with relation to the window shade roller.

Figure 4 is a sectional view taken on line 4—4 of Figure 3.

Figure 5 is a sectional view taken on line 5—5 of Figure 4.

Figure 6 is an end view of the window shade roller and one of its brackets.

Figure 7 is a fragmentary top plan view of Figure 6.

Before entering into a detail description of what is herein illustrated, I desire to have it understood that the attachment or accessory forming the subject matter of this invention is adapted to be used on automobiles of the closed type, and is adapted to be used in connection with any one of the windows forming part of the vehicle structure. In other words the invention is not limited in use for the benefit of the driver, but can be mounted on any or all the windows of the vehicle to be used by other occupants of the car.

Referring to the drawings in detail 10 represents a part of an automobile of the closed type, wherein 11 represents the door at the front left side of the vehicle, which door is of usual construction being formed with a window frame 12 in which is slidably arranged a glass panel or window 13. This panel is adapted to be raised or lowered in the ordinary well known manner. Mounted within the car and immediately above the window opening is the usual window shade roller 14, the latter being journalled in suitable brackets of any well known construction, one of which brackets is indicated at 15 in Figures 3, 6 and 7. The window shade is indicated at 16 and is adapted to be wound about and unwound from the roller 14 by means of the attachment forming the subject matter of the invention, the shade being always held taut by the spring of the roller, which is relieved of its clutch or ratchet mechanism, which is usually employed to hold the roller in a given position. The roller 14 at one end is provided with a flange 17 clearly shown in Figures 6 and 7 and which flange is normally engaged by a thumb screw 18 terminating to provide a pointed extremity, which contacts the flange 17 to assist in holding the shade 16 in a given position against the influence of the spring of the roller. The thumb screw 18 for this purpose cooperates with another means to be hereinafter described for holding the shade in a certain position.

The attachment as shown in this specific instance includes a substantially U-shaped frame, the spaced parallel arms of which are indicated at 19, while the cross member connecting the lower extremities of these arms is indicated at 20. This cross member is preferably in the form of a hollow tube which receives pins 21 carried by the lower extremities of the arms 19 and utilized to connect the cross member 20 with said arms in a manner to permit the cross member to be readily and conveniently separated from the arms as the occasion may require. The arms 19 possess a desired degree of resiliency to permit either of them to be slightly flexed for the purpose of removing one of the pins 21 from the adjacent end of the cross member 20, after which the cross member can be separated from the other arm 19. As clearly shown in Figures 3 and 4, this cross member 20 is adapted to be passed through the hem 22 formed on the lower end of the window shade 16. The upper end of each arm 19 is pivoted onto a bracket adapted to be secured to the adjacent side of the window casing 12, and one of these brackets and the manner in which it is secured in place is clearly shown in Figures 3, 4, and 5. As both brackets are identical in construction, a description of one will suffice for both. The bracket is indicated at 23 and is secured to the adjacent side of the window frame by suitable fastening elements 24. Projecting inwardly from the upper end of the bracket is a flange 25 which supports a pair of spaced vertically disposed threaded elements 26 and 27 respectively, which are adjustable for a purpose to be presently described. The adjacent arm 19 is arranged in face to face contact with the bracket 23 and pivoted upon a threaded element 28, which element is passed through an opening in the arm 19 and threaded into a corresponding opening in the bracket 23. Supported upon this element 28 and interposed between the head 29 thereof and the arm 19 is a friction washer 30, which is used to frictionally hold the frame or attachment fixed with relation to the window casing in any of its given positions. Manifestly by tightening the threaded element 28, the washer 30 is forced to engage the adjacent arm 19 of the frame with the desired degree of friction to hold the attachment in any adjusted position and at the same time allow the frame or attachment to be easily and conveniently swung within the car, or beyond the sides of the car as shown by dotted lines in Figure 2. The adjustable elements 26 and 27 above referred to as being carried by the flange 25 of the bracket are utilized to limit the upward swinging movement of the frame as clearly shown in Figure 4. The element 26 engages the adjacent arm 19 when it is swung inwardly of the car, while the threaded element 27 engages the arm 19 when it is swung outwardly of the car through the window opening. For the purpose of preventing the washer 30 from turning or moving with the adjacent arm 19, I employ a pin 31 which is adapted to be passed through align openings formed in the bracket 23 and the washer 30 as clearly illustrated in Figure 5.

In use, the attachment in its entirety can be arranged vertically and immediately adjacent the panel 13 when the latter is fully closed, or it may be swung inwardly of the vehicle to occupy any particular position to permit the occupant or driver of the vehicle to readily see through the window. After the windows have been lowered the attachment can be swung outwardly through the window opening, and arranged at any angle with relation to the vehicle body to protect the occupant from the sun. The invention is very simple in construction, can be manufactured and sold at a nominal cost, and can be easily and conveniently installed without making any changes or alterations in the vehicle construction.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

1. A vehicle attachment comprising a pair of brackets secured to the opposed side of the window frame of said vehicle, each bracket including an inwardly directed horizontal flange, threaded elements supported centrally on said brackets, each including a head, a U-shaped member pivotally mounted on said threaded elements and capable of being swung inwardly of said vehicle or outwardly thereof through the window opening, a shade roller journaled on said window frame above the U-shaped member, said pivoted members being connected with the free edge of said shade, whereby the latter is wound about or unwound from its roller incident to the movement of said member, washers supported on said threaded elements and arranged between the hinge thereof and the adjacent portions of said pivoted members and adapted to frictionally hold said pivoted members fixed with relation to the window in any given position, the threaded elements being adjustable to vary the friction between the washers and said member, and spaced stops supported by each flange and arranged to limit the upward movement of the pivoted members when swung in either direction.

2. A vehicle attachment comprising a bracket mounted upon the opposed side of the window frame of the vehicle, threaded elements arranged centrally of the bracket, a U-shaped member pivoted on said elements and capable of being swung inwardly of the vehicle or outwardly thereof through the window opening, brackets secured to the window frame above the pivoted member, a window shade roller journaled in said brackets and including an annular flange at one end thereof, said pivoted member being connected with the free edge of said shade, whereby the latter is wound about or unwound from said roller incident to the movement of said member, a pin carried by one of the last mentioned brackets and contacting the flange on said roller to assist in holding the latter against casual rotation, washers mounted on said threaded elements and interposed between their ends thereof and the adjacent portions of the pivoted member and adapted to frictionally engage said member to hold the latter fixed relatively to the window frame, and also assist in holding the roller against casual rotation, the friction between the washers and said member being varied by said adjustable element.

In testimony whereof I affix my signature.

JAMES L. DROHEN.